United States Patent [19]

De Azevedo, Jr. et al.

[11] Patent Number: 4,964,036
[45] Date of Patent: Oct. 16, 1990

[54] CHANNEL HARDWARE DIAGNOSTIC APPARATUS AND METHOD

[75] Inventors: Joao B. De Azevedo, Jr., Endicott, N.Y.; Peter N. James, Algonquin, Ill.

[73] Assignee: International Business Machines Corporation, Armonk, N.Y.

[21] Appl. No.: 290,419

[22] Filed: Dec. 21, 1988

[51] Int. Cl.⁵ .......................... G06F 11/00; G06F 3/00
[52] U.S. Cl. .................... 364/200; 371/20.1; 364/241.9; 364/267
[58] Field of Search ............ 364/200, 300, 900; 371/20.1

[56] References Cited

U.S. PATENT DOCUMENTS

| | | |
|---|---|---|
| 4,031,375 | 6/1977 | Jaskulke et al. ............ 371/16.1 |
| 4,155,117 | 5/1979 | Mitchell, Jr. et al. ......... 364/200 |
| 4,386,400 | 5/1983 | Cope et al. ................. 364/200 |
| 4,719,626 | 1/1988 | Ogasawara .................. 371/16 |
| 4,730,313 | 3/1988 | Stephenson et al. ............ 371/5 |

FOREIGN PATENT DOCUMENTS

| | | |
|---|---|---|
| 61-067164 | 4/1976 | Japan. |
| 54-100235 | 8/1979 | Japan. |
| 59-178513 | 10/1984 | Japan. |
| 60-055457 | 3/1985 | Japan. |

OTHER PUBLICATIONS

IBM Technical Disclosure Bulletin, vol. 25, No. 4, Sep. 1982, "Channel Check System" by L. C. Eggebrecht and J. W. Freeman, pp. 2221-2222.

IBM publication GA22-6974-09, File No. S360/S370-19, IBM System/360 and System/370/I/O Interface Channel to Control Unit Original Equipment Manufacturers' Information.

*Primary Examiner*—Raulfe B. Zache
*Attorney, Agent, or Firm*—Baker, Maxham, Jester & Meador

[57] ABSTRACT

Provision is made for conducting an I/O channel diagnostic test by using a first I/O channel in a test mode to provide a sequence of test signals to a second I/O channel. The second I/O channel responds to the test sequence by producing a series of data transfer protocol signals which are conducted to the first channel. In the first channel, the series of data transfer protocol signals are used to check operation of the second channel.

5 Claims, 7 Drawing Sheets

EXTERNAL WRAP MODE

BIDIRECTIONAL DATA CONTROL

FIG. 3 EXTERNAL WRAP MODE

INTERNAL WRAP MODE

CHANNEL HARDWARE DIAGNOSTIC APPARATUS AND METHOD

BACKGROUND OF THE INVENTION

The field of this invention includes computers, and particularly relates to the input and output (IO) system of a computer which has a plurality of parallel channels, each consisting of special-purpose processor, together with necessary hardware. Each channel operates to transfer information between the main storage of the computer and one or more I/O devices. The invention concerns the testing of one channel using the facilities of another channel.

In IBM Systems that implement one or more of the following architectures: System/360; System/370; System/370-XA; and Enterprise Systems Architecture 370, I/O operations are conducted through a channel to transfer information between the main storage of the computer and one or more inputing, outputing, and off-line storage devices. The term "channel" is understood to apply to all such systems. In each of these systems, a channel represents a "plug" to which a control unit linking one or more I/O devices can be connected to exchange information with main storage. For an understanding of channel operation and structure, see "IBM System/360 and System/370 I/O Interface Channel to Control Unit Original Equipment Manufacturers' Information", GA22-6974-09, Tenth Edition, February 1988.

In FIG. 1, a pair of prior art channels are shown occupying a channel interface adapter (CIA) 10. The first channel is denoted as channel A, the second is channel B. Each channel provides an external interface to a respective one of I/O control units (CU) 12 and 14. Each control unit serves as a primary interface for plurality of I/O units, such as units 16 and 18. Each of the control units 12 and 14 is linked with a respective channel in the CIA 10 by a bidirectional data/control interface. The interfaces in FIG. 1 are multi-conductor cables 20 and 21.

Each of the channels in the CIA 10 is linked to a shared channel processor (SHCP) 28 and a channel data buffer (CDB) 30. The connection with the shared channel processor 28 is by way of a bi-directional, m-path control signal interface 31. CDB 30 is connected to channels A and B by way of a bi-directional, n-path data bus 32.

FIG. 1 is representative of the basic complement of prior art channel technology. The SHCP 28 is a sophisticated multi-processor capable of conducting a plurality of concurrently-executing transfer processes through a plurality of channels in a plurality of CIA's. The CDB 30, likewise has provision for serving a plurality of channels on a plurality of CIA's.

With the channel structure illustrated in FIG. 1, a process (PROCESS) 35 executing in a CPU 37, can cause the transfer of data either from or to a main storage 39 by providing an I/O instruction to the SHCP 28. The instruction initiates an I/O process in the SHCP 28 which is conducted through a channel, for example, one of the channels A or B. The I/O process causes the addressed channel to execute an initial selection sequence to select an I/O device, send a command to the selected I/O device and retreive initial status from the selected I/O device. The I/O process also establishes the direction of information flow and the possible modes of information transfer the channel can support; the actual mode of information transfer is establsihed later when the actual data transfer is started. After completion of the initial selection sequence, as indicated by the selected I/O device returning zero initial status, data is transferred between the CDB 30 and an I/O device through a selected channel.

A complete test of the hardware of a channel, including data transfers at rated speed, requires the attachment of a control unit. Such a test is usually executed during the final steps of the manufacturing process. In FIG. 2, a maintenance control unit (MCU) 41 is linked by a maintenance cable 43 to channel A for testing. In the prior art, the MCU 41 undertakes a predetermined I/O diagnostic transfer sequence with the channel to which it is connected. Thus, conducting a diagnostic analysis of a failure of channel A requires provision of stand-by equipment in the form of MCU 41. As is known, the MCU 41 is large, expensive, and located at the manufacturing site. Therefore, comprehensive testing can only be done at the plant and not where channel equipment is installed. Consequently, use of the MCU is time-consuming, costly, and inconvenient.

SUMMARY OF THE INVENTION

This invention is founded upon the inventors' critical observation that use of one channel as a source of diagnostic signal flow for a second channel would provide, first, the capacity to conduct diagnostic procedures under approximately authentic conditions. Second, it would obviate the need for expensive external equipment for simulating a control unit.

The invention is, therefore, understood in the context of a computer I/O system with a plurality of channels for conducting data between the computer memory and a plurality of inputting, outputting, and storage devices. The I/O system includes a shared channel means, which initiates and controls I/O transfer operations of the channels by provision of mode, channel control, and data signals to the channels. The invention is an improvement for using a first channel to determine the status of a second channel. In this regard, each of the channels of the I/O system includes an external interface for connection to an I/O unit. The improvement includes, in each of the first and second channels, an input buffer connected to the channel's external interface for buffering IN control signals from an I/O unit. Each of the channels also includes output buffer connected to the channel's external interface for buffering OUT control signals to an I/O unit. A logic circuit is also provided in each of the channels. The logic circuit is connected to the channel's input and output buffers and to the shared channel means to provide a sequence of OUT control signals in response to a sequence of IN control signals and to a first I/O transfer mode signal, the first I/O transfer mode signal indicating a non-interlocked data streaming transfer mode initiated by a first IN control signal sequence from an I/O unit. An external connector is provided for connecting the external interfaces of the first and second channels and to support conduction of OUT control signals from the output buffer of the first channel to the input buffer of the second channel and also to conduct OUT signals from the output buffer of the second channel to the input buffer of the first channel. Last, a diagnostic test signal generator is provided at least in the first channel, the diagnostic signal generator being connected to the shared channel means and to the logic circuit in the first channel. The diagnostic test signal generator is responsive to the first I/O data transfer mode signal and to a second mode signal indicative of a diagnostic data streaming test of the second channel for initiating the diagnostic data streaming test by providing a facsimile of first IN control signal sequence to the logic circuit of the first channel.

With provision of the facsimile, the first channel's logic circuit produces an OUT control signal sequence that is conducted to the input buffer of the second channel. In response to the control signal sequence conducted to its input buffer, the second channel produces an OUT control signal sequence that is conducted to the input buffer of the first channel. The invention also has provision for a checking circuit in the first channel which is connected to the first channel's input buffer and is responsive to the sequence of OUT control signal received from the second channel for producing a channel check signal conditioned to indicate a status of the second channel.

The invention is also expressed as a method in a computer I/O system having a plurality of channels. The channels in the I/O system are for conducting data between a computer memory and a plurality of inputting, outputting, and storage devices, the system including a shared channel entity for initiating and controlling I/O transfer operations of the channels by providing mode, channel control, and data signals to the channels. At least first and second of the channels each include an external interface for connection to an I/O unit, each channel also including input buffer means connected to the channel's external interface for receiving an IN control signal sequence from an I/O unit. The IN control signal sequence is for initiating and maintaining a non-interlocked, streaming mode of data transfer between a channel and I/O unit. Each channel also includes an output buffer connected to the channel's external interface for providing an OUT control signal sequence to an I/O unit in response to the IN control signal sequence. The method of the invention is for conducting a diagnostic check of the second channel by use of the first, and includes a first step of connecting the external interfaces of the first and second channels to conduct signals from the output buffer of the first channel to the input buffer of the second channel and from the output buffer of the second channel to the input buffer of the first channel. In the next step, a facsimile of an IN control signal sequence is generated in the first channel. In response to the facsimile, a first OUT control signal sequence is provided at the output buffer of the first channel and conducted to the input buffer of the second channel. Next, in response to the first OUT control signal sequence, a second OUT control signal sequence is provided at the output buffer of the second channel. The second OUT control signal sequence is conducted to the input buffer of the first channel. Last, the operation of the second channel is diagnosed in response to conduction of the second OUT control signal sequence to the input buffer of the first channel.

A significant objective of this invention is to provide for diagnostic test of an I/O channel by use of other I/O channels.

An important advantage enjoyed in realizing this objective is the ability to conduct such a diagnostic test under approximately authentic operating conditions for the second channel.

Another result achieved by this objective is the elimination of specialized test equipment for simulating a I/O control unit.

Other objectives and advantages of this invention will become evident when the following detailed description is read with reference to the below-described drawings.

BRIEF DESCRIPTION OF THE DRAWINGS

FIG. 3 illustrates a first primary diagnostic configuration used to diagnostically test a channel of the FIG. 1 I/O system by practice of the invention.

DETAILED DESCRIPTION OF THE PREFERRED EMBODIMENT

Figure 1:
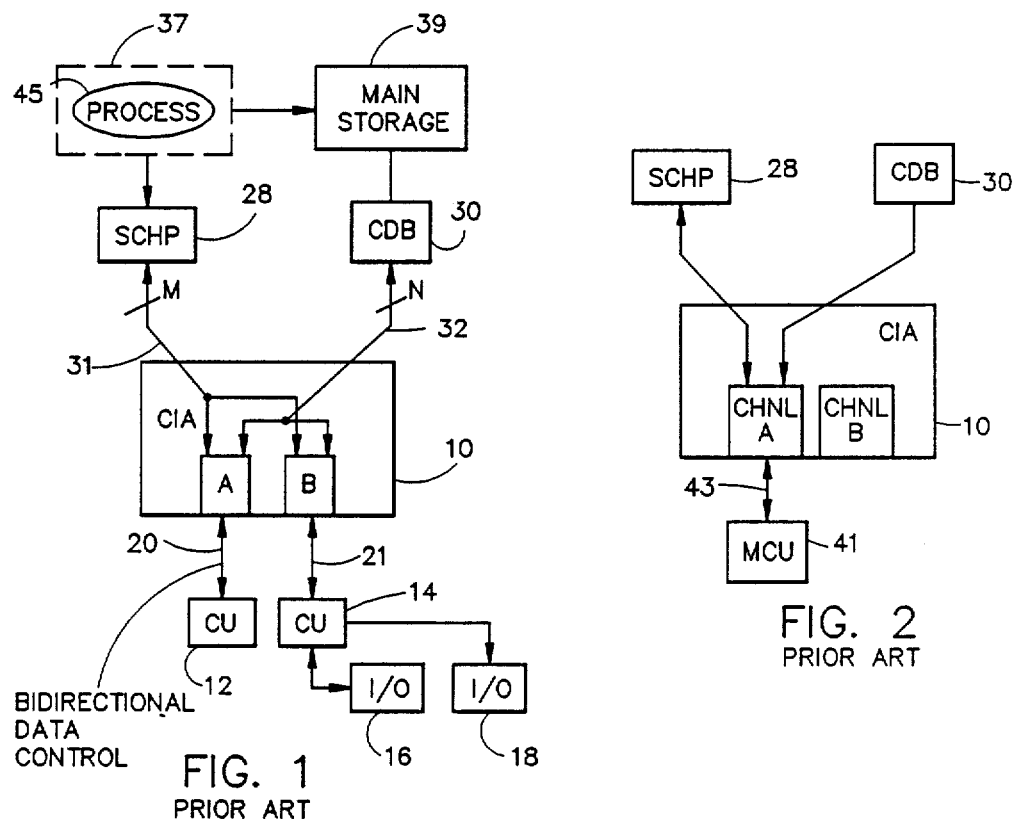
FIG. 1 illustrates the prior art configuration of a channelized I/O system for supporting the exchange of information between a computer main storage and one or more I/O devices.
Figure 2:
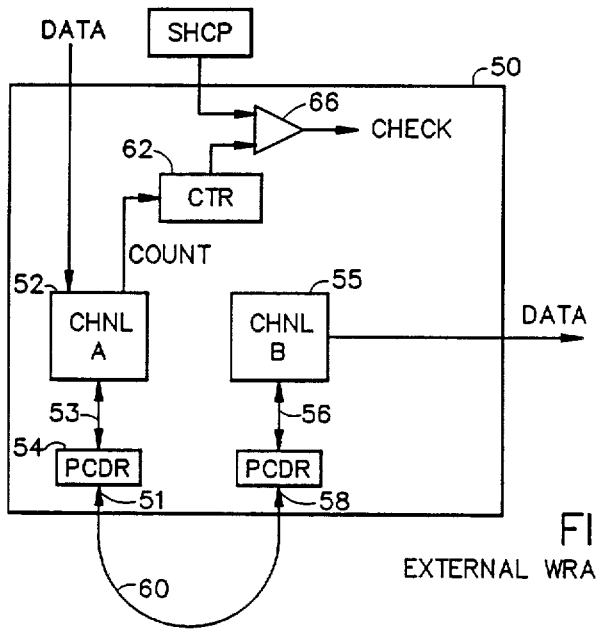
FIG. 2 is an illustration of a prior art setup for conducting a diagnostic test of a channel included in the I/O system of FIG. 1.

In the description to follow the term "channel" is used principally to denote a hardware entity including processing and interface circuitry comprising the primary computer component with which an I/O control unit or I/O device communicates. In this regard, the term "channel" does not include the interface cable between an external I/O device and the computer channel circuitry.

Further, this description is based upon a preferred channel configuration in which a single line replaceable unit (LRU) or a single replaceable module of a computer includes at least two channels.

Thus, in FIG. 3, a channel interface adapter (CIA) 50 includes two channels enumerated as A (CHNL A) and B (CHNL B), 52 and 55, respectively. Channel A includes logic and interface circuitry necessary to conduct an I/O transfer process with an external I/O control unit according to a predetermined protocol by exchanging control and data signals with the unit. The structure of channel A in FIG. 3 further includes a multi-conductor bidirectional signal path 53 and parallel channel driver receiver (PCDR) circuit 54. The PCDR 54 is understood to form the primary termination for a channel A connector 51. Thus, channel A is connected to an external I/O device through a cable attached to the connector 51.

Channel B similarly consists of logic and interface circuitry 55, a multi-conductor, bidirectional signal path 56, and a PCDR circuit 57 terminating an external connector 58.

A skilled artisan familiar with the IBM line of mainframe computers including the System/360 and System/370 architectures will understand that an I/O operation conducted through a channel proceeds according to a predetermined progression of interface sequences. These sequences are described fully in the referenced IBM document GA22-6974-09. In summary, an I/O operation includes an initial selection sequence, a data transfer sequence, and an ending sequence. An understanding of this invention requires reference only to a data transfer sequence involving a non-interlocked, data streaming mode of data transfer.

As is known, one mode of I/O data transfer is a non-interlocked data-streaming procedure. The data-streaming procedure is conducted at a relatively high rate of data transfer that is independent of the length of external cables attaching channels to I/O devices. An interlocked data transfer mode is one in which each unit of data (for example, a byte) is transferred based upon the exchange of "handshaking" signals by the channel and the I/O device.

Conventionally, such handshaking signals are exchanged by the channel and I/O unit on a bi-directional, multi-conductor interface in the external cable. Control signals originating at the channel are referred to as "tagout" signals, while signals going to the channel from the I/O device are referred to as "tagin" signals. Two tagout signals are named "data out" and "service out". Two tagin signals are denoted as "data in" and "service in". In addition, each channel has a multi-conductor output bus termed "busout" for conduction of data signals to an I/O unit. A channel is connected to receive input I/O data on a multi-conductor "busin" data bus. The "service in" tagin control signal is used to signal the channel when an I/O device is ready to send or receive a byte of information. The "service in" tagin control signal is always used to initiate an interlocked data transfer sequence. The "service in" signal rises when information is placed on the busin bus or when information is required on the "busout" bus. The "service out" tagout control signal is raised to signal to the I/O device in response to a "service in". The "service out" tagout indicates to the I/O device that the channel has accepted a byte of data on the "bus in" bus or has provided on "bus out" data requested by "service in".

In an interlocked data transfer mode for transmitting data to a channel, an I/O control unit places a data byte on busin and raises "service in". The tagin control signal and the byte on busin are maintained until the appropriate tagout control signal is raised in response. When "service out" rises, "service in" is dropped. After "service in" falls, the channel responds by dropping "service out".

To request data from a channel, "service in" rises and the channel places data on busout and raises "service out". When "service out" rises, the I/O control unit responds by dropping "service in". The byte is maintained on busout until "service in" falls. After "service in" falls, the channel drops "service out" and so on.

Data transfer in the data streaming mode is initiated by raising the "data in" tagin control signal. During data streaming, data is assumed to be valid on the appropriate data bus for a predetermined amount of time. When data streaming occurs, the rise and fall of "service in" or "data in" is independent of the rise and fall of "service out" or "data out", respectively. However, during a data streaming operation, "service out" or "data out" rises in response to "service in" or "data in", respectively, to indicate channel acceptance of information on the busin bus or provision on the busout bus of requested data. Thus, once a tagin signal is recognized and acted upon by a channel during data streaming, the corresponding tagout signal is dropped only after the corresponding tagin signal has fallen. From the standpoint of the I/O control unit, a tagin control signal sequence denotes non-interlocked data streaming, the sequence beginning with "data in" and alternating "data in" and "service in". Once the sequence is begun, each tagin control signal in the sequence is generated in a control unit after a predetermined delay from the rise of the preceding signal in the sequence.

For data transfer during a data streaming operation, once a tagin control signal is recognized and acted upon by a channel, the tagout signal is dropped only after the corresponding tagin signal has fallen. Thus, "data out" rises and falls only in response to the rise and fall of "data in", and "service out" rises and falls only in response to the rise and fall of "service in".

A data streaming data transfer operation is ended by the control unit by provision of a "status in" tagin signal to a channel.

The data streaming mode is employed in the invention to diagnose the operation of one channel of a CIA by use of the CIA's other channel. This diagnostic testing is performed in the invention in a first, principal, "external wrap" mode. The diagnostic procedure follows the external wrap mode with a "internal wrap" mode. These two modes can be understood by reference to FIGS. 3 and 4.

In FIG. 3, the external wrap mode connects channel A to channel B in such a manner as to make channel A appear to be an I/O control unit entering data into channel B. Channel B responds appropriately according to the data streaming procedure outlined above.

In the external wrap mode, an external channel conductor 60 connects channel A with channel B through the connectors 51 and 58. The cable 60 is constructed to conduct tagout signals from channel A in such a manner as to appear to be tagin signals for channel B. Similarly, tagout control signals from channel B are conducted as tagin signals to channel A. A data streaming mode transfer operation is initiated in a manner described below such that a tagout control signal sequence from channel A beginning with a "data out" signal and alternating "data out" with "service out" is conducted as a "data in"/"service in" sequence to channel B to initiate and maintain a data streaming transfer in to channel B. The "data out"/"service out" tagout control sequence produced by channel B during this transfer is provided through the cable 60 to channel A. Channel A directs the tagout control signal sequence provided by channel B to a counter 62. The output of the counter 62 is compared against a number held by a shared channel processor (SHCP) in a conventional digital comparator 66. The result of the comparison is provided as a CHECK signal, indicative of channel B's performance.

Figure 4:
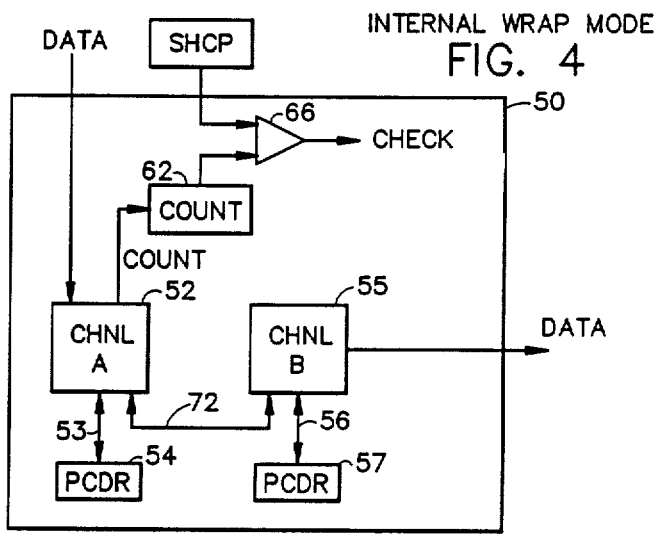
FIG. 4 illustrates a second primary configuration for testing channel status.

In the internal wrap mode of FIG. 4, the procedure described above is conducted over an internal signal pathway 72, which connects the logic and interface circuitry of channel A with the logic and interface circuitry of channel B. It will be evident upon inspection that comparison of results obtained with the external wrap mode of FIG. 3 with the internal wrap mode check signal of FIG. 4 can be used in isolating a malfunction of the of PCDR's.

Figure 5:
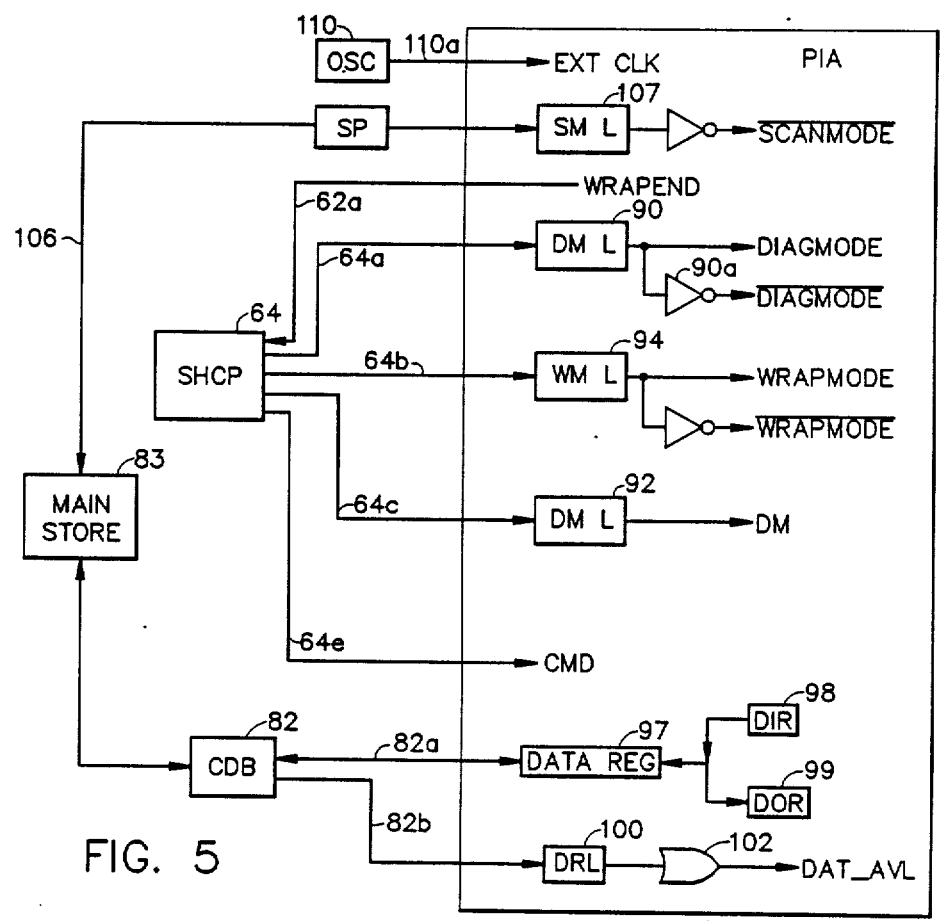
FIG. 5 illustrates the primary mode, control, and data interfaces between a dual-channel interface adapter and shared channel resources.

The operational mode of a channel established under control of the SHCP 64 is indicated in FIG. 5. The SHCP 64 has signal lines 64a through 64e for conduction of channel control and command signals to the logic circuitry of each channel; FIG. 5 shows the interconnection with channel A, it being understood that an identical interface is provided for channel B. The computer data interface with channel A is through a CDB 82, which has a bi-directional data transfer bus 82a. In addition, a signal line 82b is provided for the CDB 82 to indicate when it has transferred a unit of data to channel A.

In channel A, a diagnostic mode latch (DMGL) 90 is connected to the signal line 64a. The latch 90, when set by SHCP 64, outputs a positive-sense signal DIAGMODE which is complemented in an inverter 90a to $\overline{\text{DIAGMODE}}$. Similarly, a WRAPMODE signal and its complement are conditioned by a WRAPMODE latch (WM L) 94 connected to the signal line 64b. Data streaming is indicated by the output of a data mode latch (DM L) 92, connected to signal line 64c. Last, channel controls are provided in the form of one or more commands on the signal line 64c.

Channel A provides a signal WRAPEND on signal line 62a to the SHCP 64.

Channel A includes a buffer consisting of a plurality of data registers for staging data into and from the CDB 82. One such register is indicated by 97, which has associated with it a data register latch 100. When CDB 82 transfers data to one of the buffer registers, for example, register 97, it sets the associated latch, for example, latch 100, to indicate that a byte of data has been entered into the register. The outputs of all the data register latches are collected by a data availability circuit 102, which produces a data availability signal, DAT AVL, for so long as there is data in any one of the registers. When channel A is outputting data, as in the internal and external wrap mode, data is staged, byte-by-byte from the registers 97 through the data output register (DOR) 99. When channel A receives data from an I/O unit, the data is staged from channel A's "data in" data bus through a data input register (DIR) 98 on a byte-by-byte basis to the CDB through the buffer registers.

To support diagnostic operations, a support processor (SP) has a signal line 104a connecting to a scan mode latch (SM L) 107. When the scan mode latch 107 is reset, the complementary signal $\overline{\text{SCAN MODE}}$ is positive.

An external oscillator (OSC) 110 provides a conventional clock signal, called external clock (EXT CLK), on a signal line 110a to channel A.

Assuming that FIG. 5 now represents the interface of channel B, while channel A is in internal or external wrap mode, the flow of data through channel B is of interest in further diagnosing the integrity of data transfer through channel B. In this regard, the data transferred from channel A to channel B during a diagnostic test of channel B is transferred to a computer main store 83 through the data input register 98, the register 97, and the CDB 82. When received in the main store 83, the data transferred through channel B during a diagnostic test can be compared with the data provided through channel A, which is also held in the main store, the comparison being done by the service processor 104 over the data bus 106.

Table I indicates how the SHCP 64 conditions the WRAP MODE, and DIAGMODE signals for the external wrap mode, the internal wrap mode, the normal mode, and the diagnostic mode of operation.

TABLE I

|  | WRAPMODE LATCH | DIAGMODE LATCH |
| --- | --- | --- |
| EXT. WRAP MODE | 1 | 0 |
| INT. WRAP MODE | 1 | 1 |
| NORMAL MODE | 0 | 0 |
| DIAGNOSTIC MODE | 0 | 1 |

It is assumed that, during any of the modes of operation defined in Table I, the DM and $\overline{\text{SCAN MODE}}$ signals are set.

Figure 6:
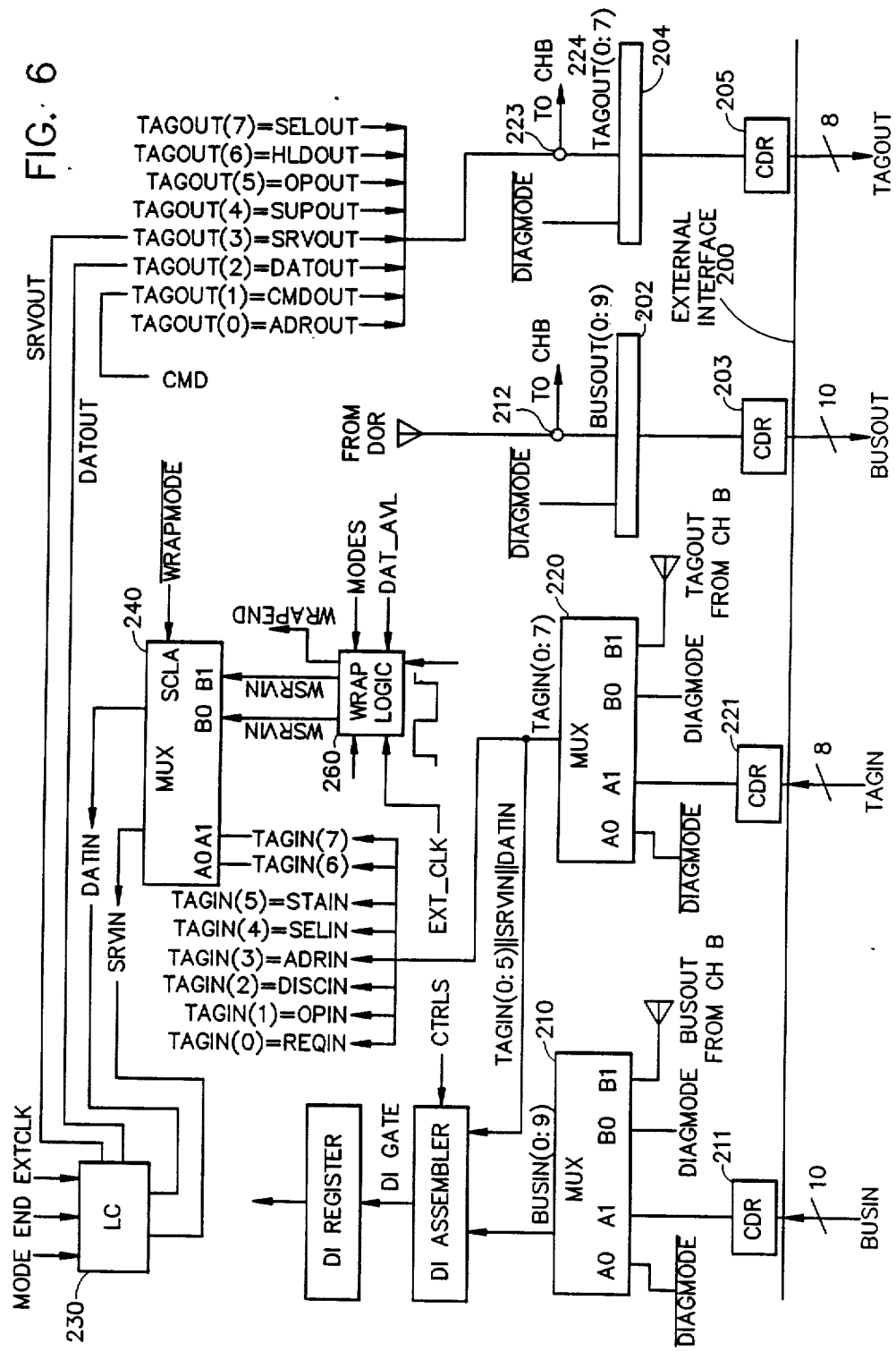
FIG. 6 illustrates, in block diagram form, an I/O channel configured according to the invention.

For understanding the invention, channel A will now be described with reference to FIG. 6. It is to be understood that the structure illustrated in FIG. 6 is precisely replicated in channel B. Channel A has an external interface 200 for connection to TAG OUT and BUS OUT signal paths. Each of these signal paths presents the physical connector interface by which channel A is connected to an I/O control unit for providing BUS-OUT and TAGOUT signals to the control unit. The external interface also provides physical connector leads labeled BUSIN and TAGIN to channel A from an I/O control unit to which channel A is connected. For the busout connections, an output buffer is provided consisting of a multi-conductor busout gate 202 connected to a multi-conductor channel driver-receiver (CDR) unit 203. For tagout connections, the output buffer also includes a multi-conductor tagout gate 204 connected to a multi-conductor CDR 205.

An input buffer for channel A consists of a busin multiplexer 210 which selects between a first multi-conductor input A1 connected to a multi-conductor CDR 211 and a second multi-conductor input B1 connected to receive busout signals from channel B. The source of channel B busout signals can be understood with reference to the input of the gate 202 where a node 212 indicates a connection of the BUS OUT signals of channel A to the multiplexer input buffer of channel B corresponding to the multiplexer 210. Thus, there is cross-connection of the bus out signals between channels A and B with the busout signal of either channel connected to the multiplexer in the input buffer of the other channel. These crossconnections form part of the internal path 72 of FIG. 4.

Returning to the description of the input buffer of channel A, selection of signal source is made by the complementary signal pair DIAGMODE and $\overline{\text{DIAG MODE}}$. Thus, with reference to FIG. 6 and Table I, it will be appreciated that during the external wrap and normal modes of operation the source of the operating channel's busin signals is the CDR connected to the multiplexer 210 in the input buffer. Alternatively, in the internal wrap mode, the busin signals are obtained directly from the busout gate in the output buffer of the other channel.

The input buffer of channel A also includes a multiplexer 220 having A1 and B1 inputs. The A1 input of the multiplexer 220 is connected to the output of the CDR 221, which is fed, in turn, by the external connector tagin lines for channel A. The B1 input of the multiplexer 220 is fed from the data line in the output buffer of channel B corresponding to the data line 224 which is connected to the input of the output buffer gate 204 at node 223. Thus, in the external wrap and normal modes of operation, the tagin signals provided through the external connector to channel A are selected by the multiplexer 220. During the internal wrap mode, the multiplexer 220 feeds signals obtained at the input of the tagout gate of channel B. These tag cross-connections form the remainder of the internal path 72 of FIG. 4.

In addition, during internal wrap mode, the reset condition of the $\overline{\text{DIAGMODE}}$ signal disables the gates 202 and 204, preventing them from forwarding busout and tagout signals to the CDR's 203 and 205, respectively.

During internal and external wrap mode operations, data obtained form the CDB 82 is transferred by channel A as busout signals from the data output register 99.

It is asserted that a logic circuit (LC) 230 operates conventionally in response to a "data in"/"service in" (DATIN/SRVIN) sequence of tagin control signals to produce a corresponding sequence of tagout signals consisting of "data out" (DATOUT) and "service out" (SRVOUT) signals. The LC 230 provides these signals as tagout signals to the tagout gate 204 of the output buffer. In this regard, the LC 230 receives the previously-defined mode signals to raise and lower DATOUT or SRVOUT in response to rise and fall of a DATIN or SRVIN signal during all four modes of operation illustrated in TABLE I. In addition, the LC 230 includes means for decoding CMD signals from the SHCP, one of these signals being decoded as an END signal. The END signal is provided by the LC 230 to the tag out gate 204 as a CDOUT signal.

A multiplexer 240 provides tagin signals corresponding to "data in" and "service in" as DATIN and SRVIN, respectively, to the LC 230. When channel A is operated in the normal mode, the multiplexer selects the SRVIN and DATIN from corresponding tagin signals obtained from the multiplexer 220. During the internal and external wrap modes, channel A obtains facsimile SRVIN and DATIN signals from a wrap logic circuit 260. These signals are facsimiles in that they are not produced by an external I/O control unit, but rather internally in channel A by means of the wrap mode logic. The wrap mode logic circuit receives the above-described mode signals, together with the DAT AVL signal and EXT CLK signals, and generates "wrap data in" and "wrap service in" signals in response. These signals are selected by the multiplexer 240 during wrap mode operations for provision to the LC 230 as the DATIN and SRVIN signals, respectively.

Figure 8:
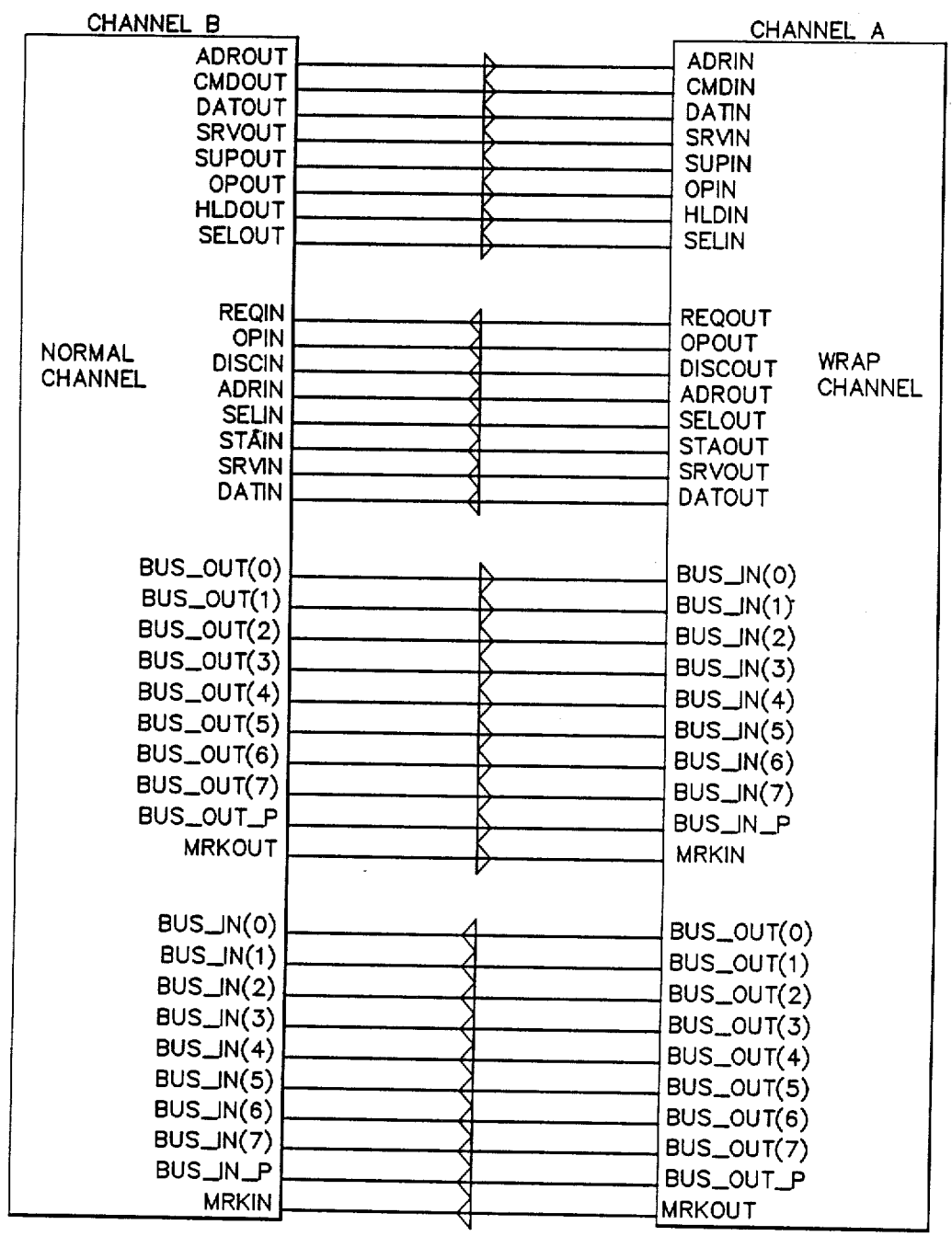
FIG. 8 illustrates an external connection between a first channel operated in a wrap diagnostic mode and a second channel operated in a normal mode.

Refer now to FIGS. 6 and 8 for an understanding of how channels A and B are configured according to FIG. 3 for conducting an external wrap diagnostic test on channel B. FIGS. 6 and 8 illustrate the breakout of the tagout and tagin lines for both channels A and B. On the outside of the external interface, it is asserted that an external cable connects the busin and tagin lines of channel A to the busout and tagout lines, respectively of channel B and connects the busout and the tagout lines of channel A to the busin and tagin lines, respectively of channel B. Thus, the output buffer of channel A is connected to the input buffer of channel B and the output buffer of channel B to the input buffer of channel A. As FIG. 8 shows, channel A is designated as the wrap channel, and channel B as the normal channel. The external cable 60 (FIG. 3) connects busout lines of the wrap channel to correspondingly-designated busin lines of the normal channel and connects the busout lines of the normal channel to the correspondingly-designated busin lines of the wrap channel. The external cable also connects the tagout lines of the wrap channel to tagin lines of the normal channel and the tagout lines of the normal channel to the tagin lines of the wrap channel. In the preferred embodiment, DATOUT (data out) and SRVOUT (service out) tagout lines of the wrap channel are connected to the DATIN (data in) and SRVIN (service in) tagin lines of the normal channel. In addition, the "command out" (CMDOUT) tagout line of the wrap channel is connected to the "status in" (STAIN) line of the normal channel. Last, the DATOUT, SRVOUT, and CMDOUT lines of the normal channel tagout signals are connected, respectively, to the DATIN, SRVIN, and STAIN connectors of the tagin lines of the wrap channel.

Returning now to FIG. 6, and assuming that FIG. 6 represents channel A, channel A is set into the external wrap mode by activation of the WRAP MODE signal and deactivation of the DIAGMODE signal. In this configuration, the multiplexer 210 and 220 have the external connections to the normal channel as illustrated in FIG. 8. Similarly, the busout and tagout connections at the external interface are connected to the tagin connectors of channel B as illustrated in FIG. 8. The multiplexer 240 receives the WDATIN and WSRVIN signals generated by the wrap logic 260. Looking at FIG. 6 from the viewpoint of channel B, the busin and tagin signals are received from the wrap channel according to FIG. 8, while the busout and tagout signals are provided to the wrap channel also according to FIG. 8. However, since channel B is in the normal mode, the $\overline{\text{WRAP MODE}}$ signal is reset. Therefore, multiplexer 240 responds to the WRAP MODE signal by selecting the SRVOUT and DATOUT (TAGIN 6) and (TAGIN 7) signals generated by channel A as the source of the SRVIN and DAVIN signals provided to the logic circuit 230.

Now, assume that a wrap mode diagnostic test of channel B is to be conducted, using channel A as the source of data signals. In this regard, first, channels A and B are connected by the external cable as illustrated in FIG. 8. Next, the SHCP provides a mode signal configuration to channel A conforming to the external wrap mode defined in Table I and a mode signal configuration of channel B conforming to the normal mode given in Table I. Concurrently, the CDB 82 provides a stream of data bytes to channel A for transmission to channel B. In channel A, the wrap logic 260 generates, first, WDATIN, followed by WSRVIN, which are forwarded through the multiplexer 240 to the logic circuit 230. Resultantly, DATOUT, followed by SRVOUT are generated conventionally by the logic circuit 230 and conducted through the tagout gate 204 of channel A to the tagin input multiplexer of channel B. Simultaneously with each pulse of WDATIN and WSRVIN, a byte of data is provided through channel A's busout gate 202 to channel B. Considering FIG. 6 from the standpoint of channel B, a DATOUT/SRVOUT sequence is conducted through the input buffer multilplexer 220 to the logic circuit through the multiplexer 240. Concurrently with each channel A DATOUT and SRVOUT received on the TAG IN line of channel B, a byte of data is received on the BUS IN line and provided to the DI register through the busin multiplexer of channel B. Each occurrence of DATOUT and SRVOUT received through channel B's tagin multiplexer is forwarded through the multiplexer 240 of channel B to channel B's logic circuit, conventionally stimulating DATOUT and SRVOUT in channel B. These tag signals are conducted through channel B's tagout gate to channel A. This sequence continues until no data remains in the data registers of channel A, causing the DAT AVL signal to drop. As explained below, this causes the wrap logic 260 to raise a signal WRAP END. This is the signal illustrated in FIG. 5, which is provided to the SHCP 64 to signal the end of a wrap diagnostic.

When the SHCP detects the WRAP END signal, it raises an END command on line 64e. This signal is received by the logic circuit 30 in channel A and converted to an END command signal which is provided to A's CMDOUT tagout line. As FIG. 8 illustrates, the CMDOUT signal is conducted to channel B on a STAIN tagin line to channel B's logic circuit as an END status. When channel B's logic circuit perceives the END on the STAIN tagin signal line, it ceases operation.

Figure 10:
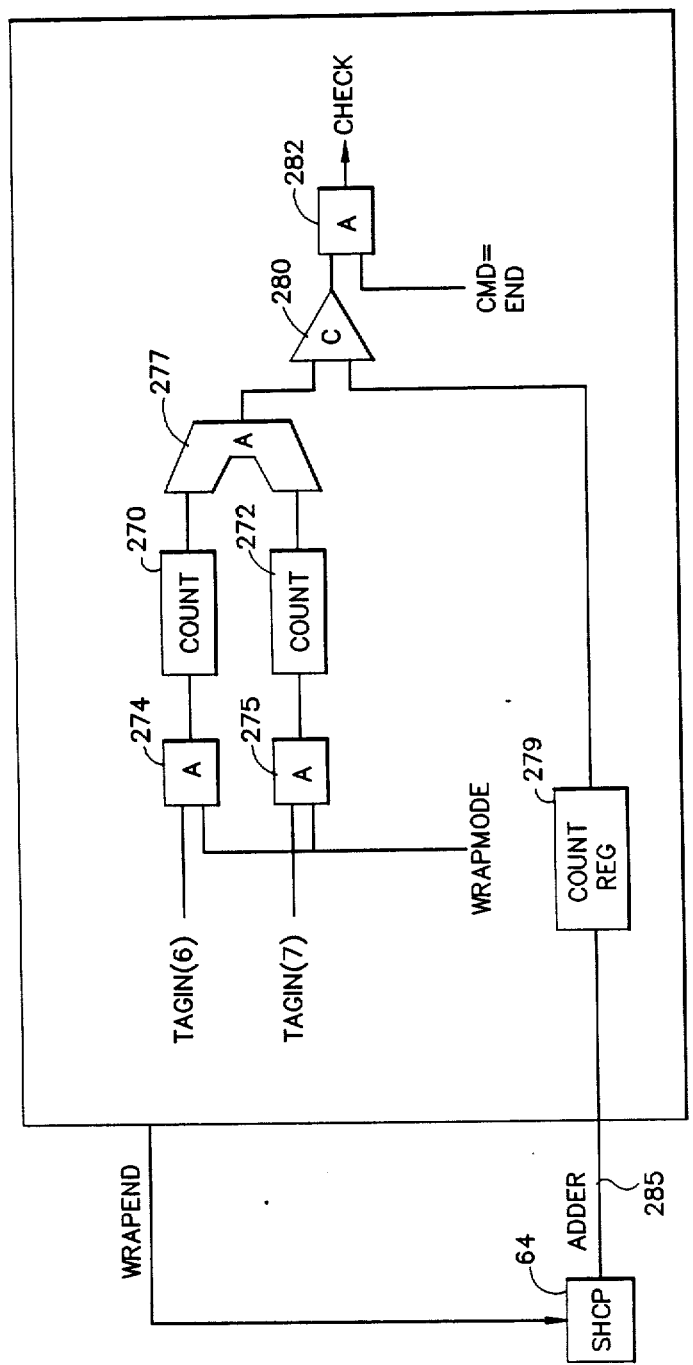
FIG. 10 is a block diagram illustrating how a check signal is generated according to the invention.

Refer now to FIG. 10 for an understanding of how the diagnostic check of channel B is conducted. In channel A, when the WRAP MODE signal is activated, a pair of counters 270 and 272 are enabled to count through AND gates 274 and 275, respectively. The counter 270 counts the occurrences of the SRVOUT signal produced by channel B and conducted to channel A, while the counter 272 counts the number of DATOUT signals produced at channel B and conducted to channel A. The counts are added in adder 277, with the sum being provided as one input to a conventional digital comparator 280. When the WRAP END signal is raised indicating that channel A is stopping the wrap diagnostic because of non-availability of data, the SCHP provides a number on an address (ADDR) bus 285 to a count register 279. The number is equal to the number of bytes provided to channel A for conduction to channel B. Assuming correct operation of channels A and B, the number of bytes should equal the total of the number of SRVOUT and DATOUT signals generated by channel B. The contents of the count register 279 are provided as the other input of the comparator 280. Since the WRAP END signal stimulates the provision of the END command, the AND gate 282 provides the output of the comparator 280 when the wrap diagnostic test has ended as a CHECK signal. If the total of SRVOUT and DATOUT signals generated by channel B matches the number in the count register 279, the CHECK signal indicates successful completion of the test. Otherwise, the CHECK signal is conditioned to indicate failure.

Following an external wrap mode test, an internal wrap mode test of channel B can be conducted. The internal wrap mode diagnostic test of channel B is initiated by configuring channel A to the internal wrap mode by conditioning the mode signals as indicated in Table I. At the same time, channel B is placed in the DIAG mode by conditioning of the mode signals as indicated in Table I. Now, with reference to FIG. 6, channel A receives channel B's tagout and busout signals through the B1 inputs of the multiplexers 220 and 210, respectively. At the same time, channel A's busout and tagout gates are disabled, with the busout and tagout signals provided from channel A to channel B on the signal lines 214 and 224. In channel B, the DIAG mode signal is set, which disables channel B's busout and tagout gates, while setting its busin and tagin multiplexers to receive the busout and tagout signals internally from channel A. In all other respects, the internal wrap mode test procedure follows that described above for the external wrap mode test.

A more complete diagnostic evaluation of channel B can be made by transfer of busin data received at channel B during an external or internal wrap mode test through channel B's the data input register 98 to the main store 83, by way of the CDB 82. This data can then be compared, after the test has been completed, with data provided from the main storage to channel A for transmission to channel B during a wrap mode test. Preferably, this comparison is conducted by the support processor 104.

Figure 7:
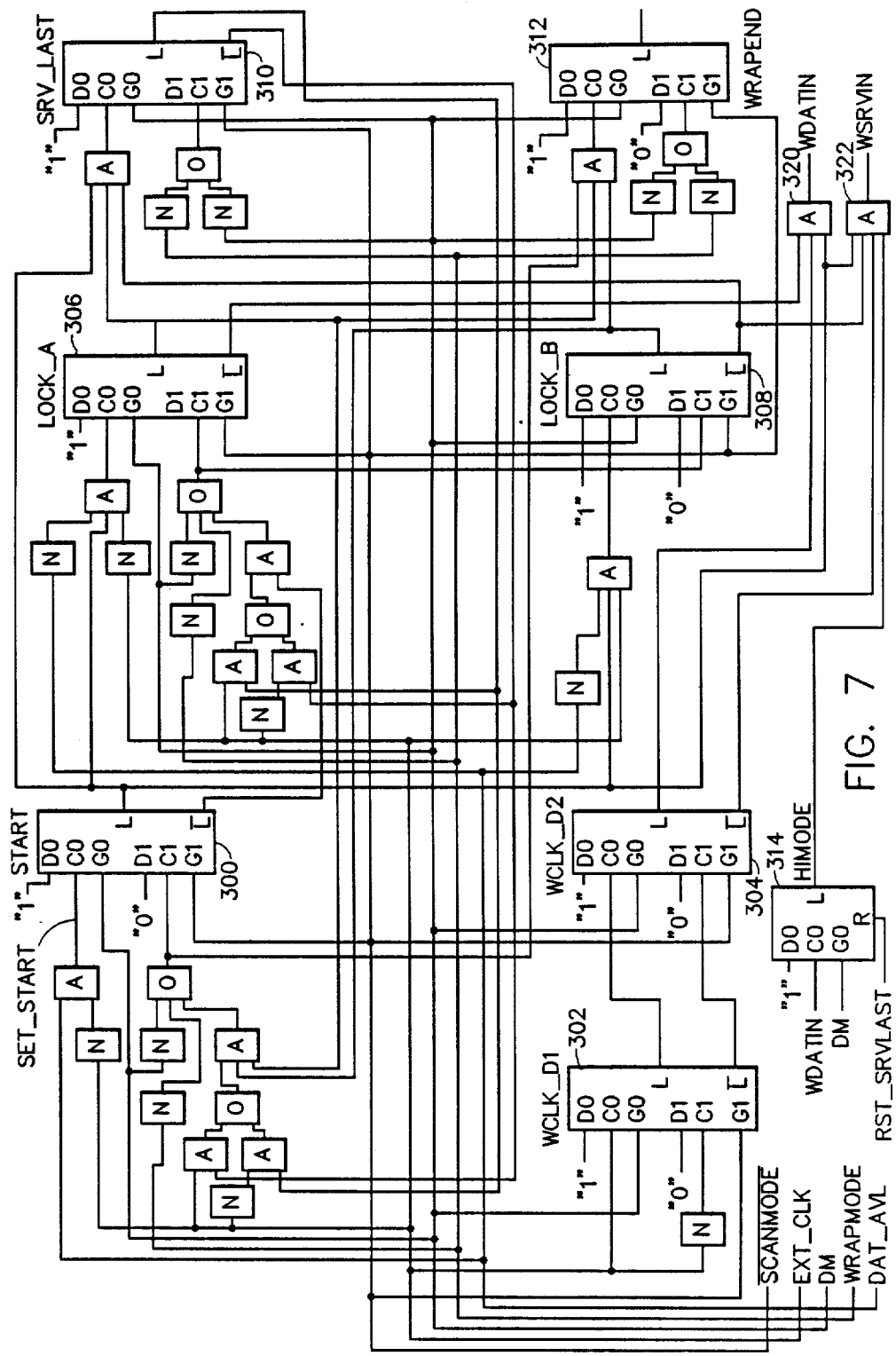
FIG. 7 illustrates diagnostic wrap test logic included in the channel of FIG. 6.
Figure 9:
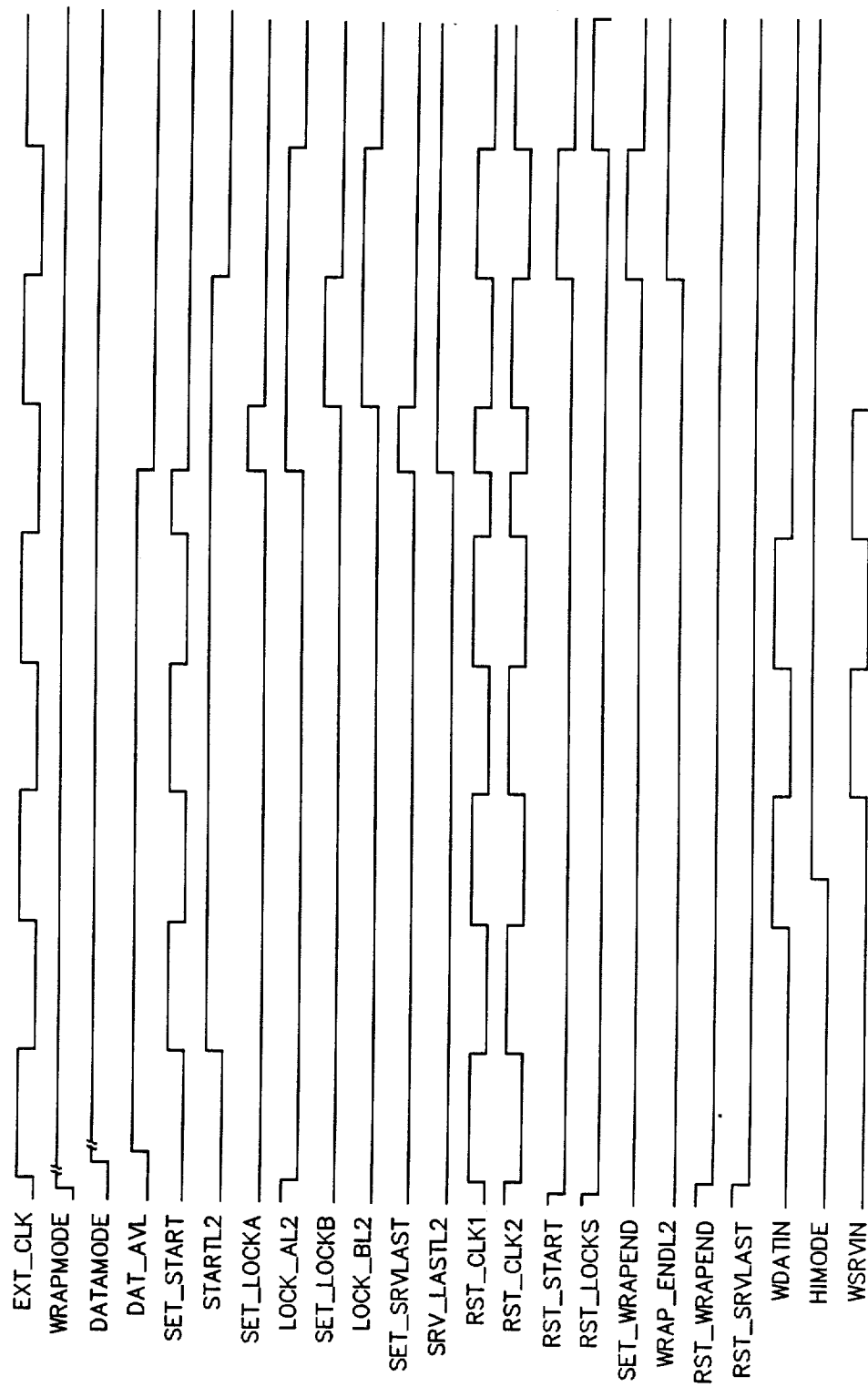
FIG. 9 is a waveform drawing illustrating the operation of the invention.

The preferred embodiment of the wrap mode logic 260 for generating the facsimile signals WDATIN and WSRVIN is illustrated by the circuit diagram of FIG. 7. In FIG. 7, a plurality of conventional scan mode latches 300, 302, 304, 306, 308, 310, 312, and 314 are connected as shown. In addition, two AND gates 320 and 322 are connected to provide as outputs, the WDTIN and WSRVIN signals, respectively. Also included in the Figure are a plurality of positive-logic and gates (A) and OR gates (O), as well as a plurality of inverters (N). When either the internal or the external wrap mode is selected, the $\overline{\text{SCAN MODE}}$, DM, and WRAP MODE signals are set. When data is available to be transferred by channel A, the DAT AVL signal rises. Under these conditions, the operation of FIG. 7 can be understood with reference to FIG. 9. In FIG. 9, the EXT CLK signal is illustrated as a conventional clock waveform. When the WRAP MODE, DM, and DAT AVL signals are all set, the first negative transition of the EXT CLK signal sets the START latch 300, as shown by the rising edge of the START L2 signal in FIG. 9. At the beginning of the WRAP MODE test, the two lock latches 306 and 308 are reset as shown in FIG. 8. WDATIN is now produced in response to the output of the clock latch 304, since the lock latch 306 is reset and the start latch 300 is set. Since the AND gate 320 is driven by the positive output of the clock latch 304, the WDATIN waveform has the shape illustrated in FIG. 9. The output of the AND gate 322 is inhibited until the occurrence of the first WDATIN signal, by operation of the latch 314. When the first WDATIN signal occurs, the latch 314 is set, producing the HIMODE signal, which now permits the output of the AND gate 322 to cycle out of phase with WDATIN, since the gate is driven by the complement output of the latch 304.

When no data is left in the channel A data input registers for transfer to channel B, the DAT AVL signal drops, beginning an end sequence of the wrap logic. The END sequence consists of first dropping the DAT AVL signal, followed by setting the lock register 306. Next, the lock register 308 is set on the first positive edge of the EXT CLK following the setting of the lock register 306. Setting the lock registers disables the AND gates 320 and 322, thereby suppressing the WDATIN and WSRVIN signals. Now, with the two lock registers 306 and 308 set, a RESET START signal is developed which resets the START latch 300 and sets the wrap end latch 312, resulting in the provision of the WRAP END signal.

Obviously, many modifications and variations of this invention are possible in light of this description. However, it will be understood by those skilled in the art that these alterations in the method and apparatus may be made without departing from the spirit or scope of the described invention.

We claim:

1. In a computer I/O system with a plurality of channels for conducting data between a computer memory and a plurality of inputting, outputting, and storage devices, said system including a shared channel means for initiating and controlling I/O transfer operations of said channels by provision of a plurality of mode signals, control signals, and data signals to said channels, an improvement for using a first channel to determine the status of a second channel, each of said first and second channels including an external interface for connection to an I/O unit, said improvement comprising:

in each of said first and second channels, an input buffer means connected to the channel's external interface for buffering IN control signals from an I/O unit;

in each of said first and second channels, an output buffer means connected to the channel's external interface for buffering OUT control signals to an I/O unit;

in each of said first and second channels, logic means connected to the channel's input and output buffer means and to said shared channel means for providing a sequence of OUT control signals through the channel's output buffer means in response to a first mode signal and to a sequence of IN control signals received through the channel's input buffer means, said first mode signal being provided by said shared channel means and indicating a non-interlocked data streaming transfer procedure initiated by a first IN control signal sequence from an I/O unit;

external connection means connectable to the external interfaces of said first and second channels for conducting OUT control signals from the output buffer of said first channel to the input buffer of said second channel and for conducting OUT control signals from the output buffer of said second channel to the input buffer of said first channel; and diagnostic signal means in at least said first channel and connected to said shared channel means and to the logic means in said first channel and responsive to said first mode signal and to a second mode signal, said second mode signal being provided by said shared channel means and being indicative of a diagnostic data streaming test for initiating said diagnostic data streaming test by providing a facsimile of said first IN control signal sequence to the logic means of said first channel.

2. The improvement of claim 1, wherein in response to said first mode signal and to said facsimile of said first control signal sequence, the logic means of said first channel provides a first sequence of OUT control signals to its output buffer said first sequence of OUT control signals being conducted to said second channel on said external connection means, and said second channel producing a second sequence of OUT control signals in response to said first sequence of OUT control signals, said second sequence of OUT signals being conducted to said first channel on said external connection means, said improvement further comprising check means in said first channel connected to the input buffer means of said first channel and to said shared channel means and responsive to said second mode signal and to said second sequence of OUT control signals for producing a channel check signal conditioned to indicate a status of said second channel.

3. The improvement of claim 1, further including:

an internal connection means for bi-directional conduction of signals between said first and second channels internal to said computer I/O system; and in each of said first and second channels, gate means connected to said shared channel means for selectively connecting the output buffer of said first channel to the input buffer of said second channel and the output buffer of said second channel to the input buffer of said first channel through said internal connection means in response to a third mode signal provided by said shared channel means.

4. In a computer I/O system with a plurality of channels for conducting data between a computer memory and a plurality of inputting, outputting, and storage devices, said system including a shared channel means for initiating and controlling I/O transfer operations of said channels by providing mode, channel control, and data signals to said channels, at least a first and second of said channels each including an external interface for connection to an I/O unit, each of said first and second channels also including input buffer means connected to the channel's external interface for receiving an IN control signal sequence from an I/O unit, said IN control signal sequence for initiating and maintaining a non-interlocked, streaming mode of data transfer between a channel and an I/O unit, each channel also including an output buffer means connected to the channel's external interface for providing an OUT control signal sequence to an I/O unit in response to said IN control signal sequence, a method for conducting a diagnostic check of said second channel by use of said first channel, said method comprising the steps of:

connecting the external interfaces of said first and second channels to conduct signals from the output buffer means of said first channel to the input buffer means of said second channel and from the output buffer means of said second channel to the input means of said first channel;

(a) generating in said first channel a facsimile of an IN control signal sequence;

(b) providing, in said first channel and in response to said facsimile, a first OUT control signal sequence at the output buffer means of said first channel;

(c) conducting said first OUT control signal sequence to the input buffer of said second channel;

(d) providing, in said second channel and in response to said first OUT control signal sequence, a second OUT control signal sequence at the output buffer means of said second channel;

(e) conducting said second OUT control signal sequence to the input buffer means of said first channel; and (f) diagnosing the operation of said second channel in response to conduction of said second OUT control signal sequence to the input buffer means of said first channel.

5. The method of claim 3 further including the steps of:

disconnecting the external interfaces of said first and second channels;

connecting, internally to said computer I/O system, the output buffer means of said first channel to the input buffer means of said second channel and the output buffer means of said second channel to the input buffer means of said first channel; and, thereafter, performing steps (a-f) in sequence.

* * * * *